(12) United States Patent
Madineni et al.

(10) Patent No.: US 11,368,316 B2
(45) Date of Patent: Jun. 21, 2022

(54) APPLYING PKI (PUBLIC KEY INFRASTRUCTURE) TO POWER OF ATTORNEY DOCUMENTS

(71) Applicant: International Business Machines Corporation, Armonk, NY (US)

(72) Inventors: Narayana Aditya Madineni, Southport (AU); Matthew Green, Ashmore (AU)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/828,185

(22) Filed: Mar. 24, 2020

(65) Prior Publication Data

US 2021/0306156 A1   Sep. 30, 2021

(51) Int. Cl.
 *H04L 9/32*   (2006.01)
 *G06F 21/62*   (2013.01)

(52) U.S. Cl.
 CPC ........ *H04L 9/3263* (2013.01); *G06F 21/6218* (2013.01); *H04L 9/3247* (2013.01)

(58) Field of Classification Search
 None
 See application file for complete search history.

(56) References Cited

U.S. PATENT DOCUMENTS

| 2007/0214365 | A1  | 9/2007  | Cornett    |           |
|--------------|-----|---------|------------|-----------|
| 2007/0300067 | A1  | 12/2007 | Robertson  |           |
| 2008/0222041 | A1  | 9/2008  | Mani       |           |
| 2010/0299313 | A1* | 11/2010 | Orsini     | H04L 63/20 |
|              |     |         |            | 707/652   |
| 2015/0228039 | A1  | 8/2015  | Mahgoub    |           |
| 2016/0162897 | A1* | 6/2016  | Feeney     | G06Q 20/065 |
|              |     |         |            | 705/71    |
| 2018/0205546 | A1  | 7/2018  | Haque      |           |
| 2020/0162259 | A1* | 5/2020  | Wang       | H04L 9/3263 |

FOREIGN PATENT DOCUMENTS

| EP | 0840244 A1    | 5/1998  |
| EP | 29057331 A1   | 8/2015  |
| WO | 2019202563 A1 | 10/2019 |

OTHER PUBLICATIONS

"Introduction to Blocktick—Blockchain Document Verification System", May 18, 2019, 6 pages, <https://www.blockchainexpert.uk/blog/blocktick-blockchain-document-verification-system>.
"Powers of Attorneys (and more) on a blockchain" Apr. 4, 2019, 7 pages, <https://newtech.law/en/powers-of-attorney-and-more-on-blockchain/>.
"South Korean Govt to Adopt Blockchain to Verify Power of Attorney", Asia Blockchain Review, Jun. 28, 2019, 8 pages, <https://www.asiablockchainreview.com/south-korean-govt-to-adopt-blockchain-to-verify-power-of-attorney/>.
Hegadekatti, Kartik, "Legal Systems and Blockchain Interactions", Jan. 3, 2017, 13 pages, <https://mpra.ub.uni-muenchen.de/82867/1/MPRA_paper_82867.pdf>.
Konashevych, Oleksii, "Data Insertion in Blockchain for Legal Purposes. How to Sign Contracts Using Blockchain", Oct. 2019, 19 pages, <https://www.emodel.org.ua/en/archive/2019/41-5/41-5-7>.

* cited by examiner

*Primary Examiner* — Brandon Hoffman
(74) *Attorney, Agent, or Firm* — David B. Woycechowsky

(57) ABSTRACT

Technology for using a Certificate of Authority and key based encryption in connection with legal Power of Attorney (POA) documents to control access to the POA so that security and/or immutability is enhanced. In some embodiments, PKI (public key infrastructure) is used to enhance privacy and immutability of POA data.

9 Claims, 9 Drawing Sheets

400

SCREEN SHOT DISPLAY GENERATED BY A COMPUTER

POA REQUEST INITIATED FOR POA # 3123456.

PLEASE UPLOAD THE FILE CONTAINING THE DECRYPTION KEY.
WHAT IS THE DIRECTORY / FILENAME FOR THIS KEY?

C:\DECRYPTION_KEYS\POA123456

YOU HAVE SUCCESSFULLY UPLOADED A KEY FILE.
NOW DECRYPTING POA # 123456...
NOW DOWNLOADING DECRYPTED POA # 123456
TO YOUR DOWNLOADS FOLDER IN YOUR LOCAL FILESYSTEM....

FIG. 4

APPLYING PKI (PUBLIC KEY INFRASTRUCTURE) TO POWER OF ATTORNEY DOCUMENTS

BACKGROUND

The present invention relates generally to the field of data processing of computer readable documents, and more specifically to the field of computer readable legal documents.

For purposes of this document, a power of attorney (POA, also sometimes referred to as a physical POA) is a written authorization by the grantor to a receiver to represent or act on behalf of the grantor in private, financial or legal matters. It is understood that the integrity, for legal purposes (herein sometimes referred to as "legal integrity"), of a POA document is important. For example, it is typically preferred when POA document (whether on paper only or as a computer based document) has indicia that it is genuine, that any signatures on the document are not forged, that the text in the POA document has not been altered, what the signing date of the document was, and on. It is known to store POA documents as computer readable documents.

The Wikipedia entry for "key (cryptography)," as of 10 Mar. 2020, states in part as follows: "In cryptography, a key is a piece of information (a parameter) that determines the functional output of a cryptographic algorithm. For encryption algorithms, a key specifies the transformation of plaintext into ciphertext, and vice versa for decryption algorithms. Keys also specify transformations in other cryptographic algorithms, such as digital signature schemes and message authentication codes . . . . Keys are generated to be used with a given suite of algorithms, called a cryptosystem. Encryption algorithms which use the same key for both encryption and decryption are known as symmetric key algorithms. A newer class of "public key" cryptographic algorithms was invented in the 1970s. These asymmetric key algorithms use a pair of keys—or keypair—a public key and a private one. Public keys are used for encryption or signature verification; private ones decrypt and sign. The design is such that finding out the private key is extremely difficult, even if the corresponding public key is known. As that design involves lengthy computations, a keypair is often used to exchange an on-the-fly symmetric key, which will only be used for the current session. RSA and DSA are two popular public-key cryptosystems; DSA keys can only be used for signing and verifying, not for encryption . . . . Part of the security brought about by cryptography concerns confidence about who signed a given document, or who replies at the other side of a connection. Assuming that keys are not compromised, that question consists of determining the owner of the relevant public key. To be able to tell a key's owner, public keys are often enriched with attributes such as names, addresses, and similar identifiers. The packed collection of a public key and its attributes can be digitally signed by one or more supporters. In the PKI model, the resulting object is called a certificate and is signed by a certificate authority (CA). In the PGP model, it is still called a 'key', and is signed by various people who personally verified that the attributes match the subject . . . . For most computer security purposes and for most users, "key" is not synonymous with "password" (or "passphrase"), although a password can in fact be used as a key. The primary practical difference between keys and passwords is that the latter are intended to be generated, read, remembered, and reproduced by a human user (though the user may delegate those tasks to password management software). A key, by contrast, is intended for use by the software that is implementing the cryptographic algorithm, and so human readability etc. is not required. In fact, most users will, in most cases, be unaware of even the existence of the keys being used on their behalf by the security components of their everyday software applications." (footnotes omitted)

To expand a bit on the certificates issued by a CA, mentioned in the previous paragraph, a certificate authority (CA) is a trusted entity that attests digital certificate (public key plus identity information) for an entity by signing the certificate using the certificate authority's private key. Certificate authority is not a key. It is a trust anchor and has a public key and private key. It uses its private key to sign another certificate. There can be a chain of certificates.

SUMMARY

According to an aspect of the present invention, there is a method, computer program product and/or system that performs the following operations (not necessarily in the following order): (i) receiving a power of attorney (POA) data set including a POA file that includes information indicative of a POA document; (ii) encrypting the POA file to obtain an encrypted version of the POA file using an encryption algorithm; and (iii) generating a set of decryption key(s) that are structured as data so that they can be used, individually and/or in combination, to decrypt the encrypted version of the POA file. In some embodiments, PKI is used to enhance privacy and immutability of POA data.

BRIEF DESCRIPTION OF THE DRAWINGS

FIG. 4 is a screenshot view generated by the first embodiment system;

DETAILED DESCRIPTION

Figure 1:
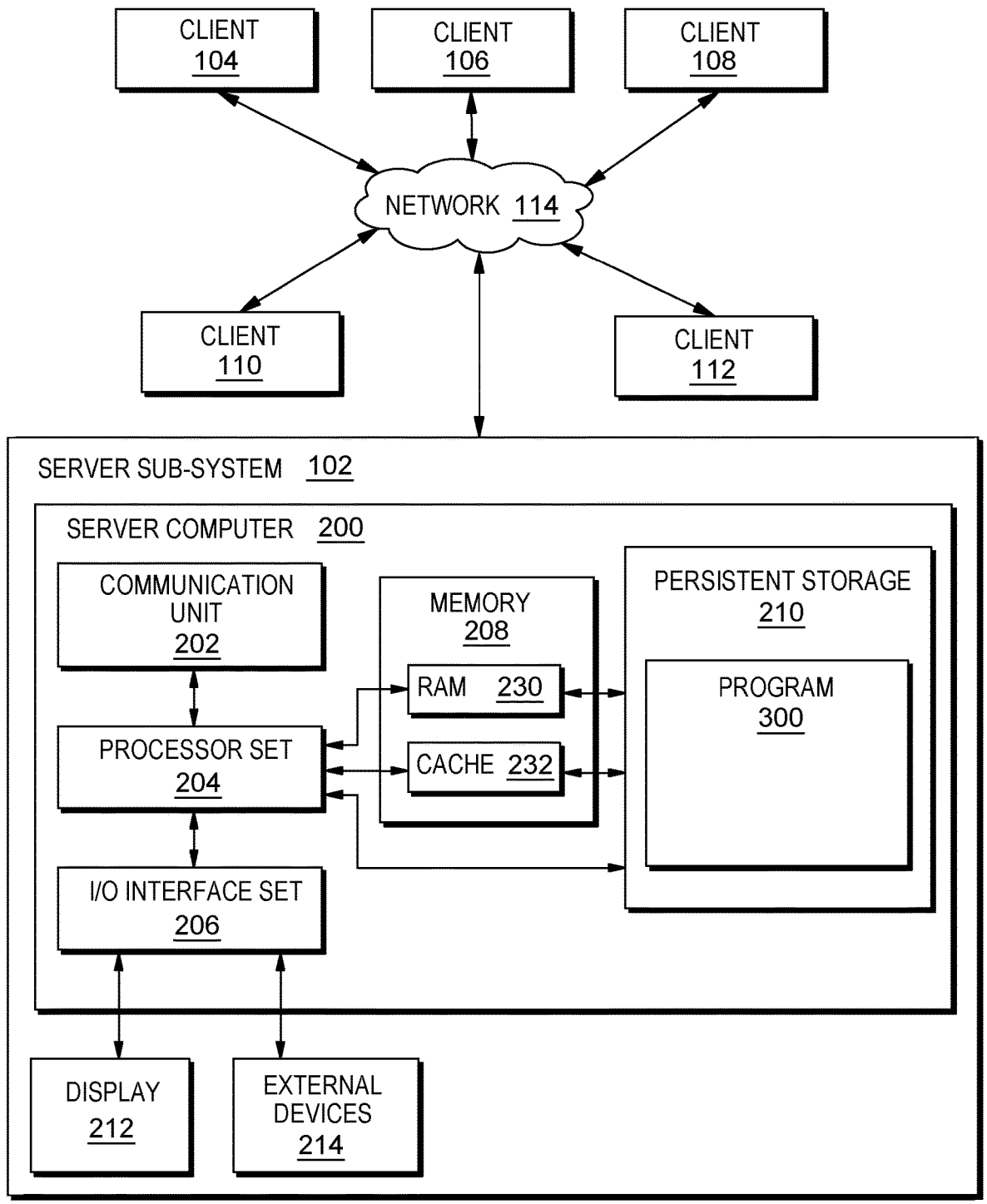
FIG. 1 is a block diagram of a first embodiment of a system according to the present invention.

Some embodiments of the present invention are directed to technology for using a Certificate of Authority and key based encryption in connection with legal Power Of Attorney (POA) documents to control access to the POA so that security and/or immutability is enhanced. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
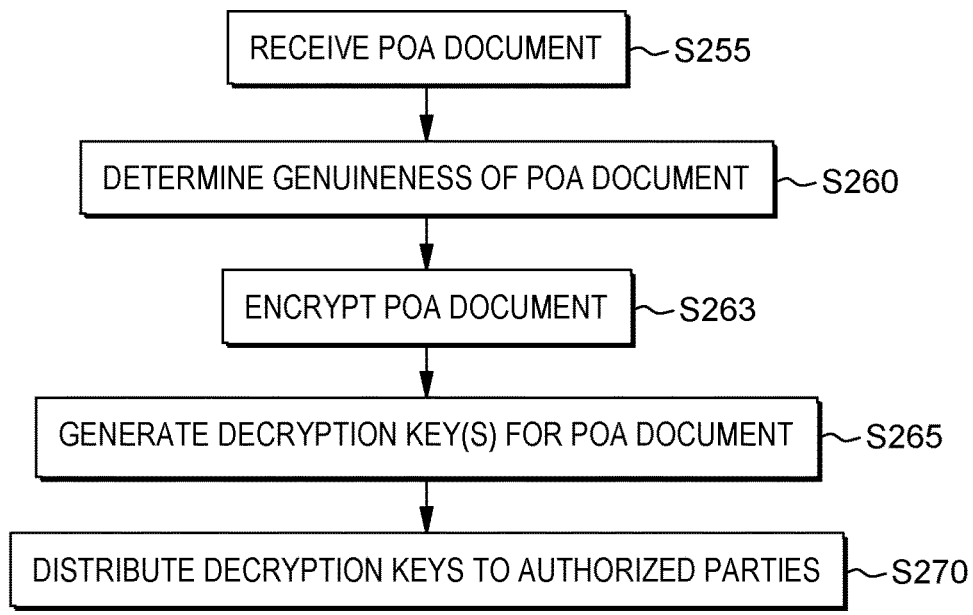
FIG. 2 is a flowchart showing a first embodiment method performed, at least in part, by the first embodiment system.
Figure 3:
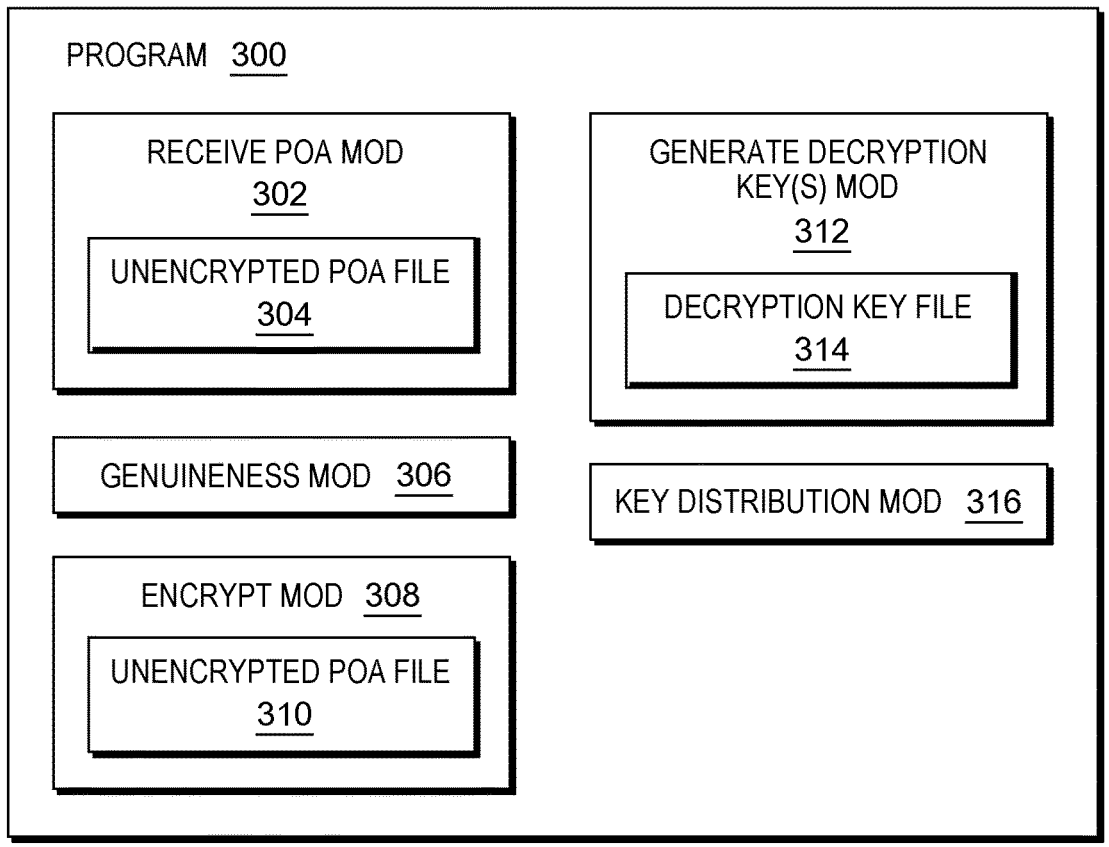
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receive POA module ("mod") 302 receives an unencrypted POA file 304 corresponding to a POA document and, also, certain metadata relating to the document (for example, date first saved information). In this example, the POA document grants a "grantor" (who does not use any of the computers shown in FIG. 1) grants a power of attorney, with certain specified limitations on effective time period and scope of subject matter to the user of client subsystem 104 (which is in the form of a smart phone in this example). In this example, the POA document is genuine and was agreed to, executed, and in substance and content is in accordance with all legal rules, laws, statutes and regulations applicable to POAs.

Processing proceeds to operation S260, where genuineness mod 306, by its machine logic, determines that the POA document is likely genuine and likely is in accordance with the laws of POAs. Alternatively, if mod 306 determined that the POA document was not genuine, or not in accordance with the laws, then it would send an email to a human POA administrator so that any issues with the POA could be sorted out.

Processing proceeds to operation S263, where encrypt mod 308 encrypts unencrypted POA file 304 to obtain encrypted POA file 310 using an encryption algorithm (not separately shown, of any type of encryption, now known or to be developed in the future).

Processing proceeds to S265, where generate decryption key(s) mod 312 generates decryption key file 314 that includes information indicative of a set decryption key(s) that can be used to decrypt encrypted POA file 310. In this example, only a single decryption key is generated or needed, so only a single decryption key is included in decryption key file 314. The next subsection of this detailed description section will discuss embodiments where the set of decryption key(s) includes multiple decryption keys (for example, a private key and a public key).

Processing proceeds to operation S270, where key distribution mod 314 distributes copies of decryption key file 314 to parties authorized to view the POA document. In this case, the authorized parties are: (i) the user of client subsystem 104, who is the human individual who has been granted the POA; (ii) the user of client subsystem 106, which is a local court of competent jurisdiction; and (iii) the users of client subsystems 108, 110 and 112, who are merchants and/or healthcare provider organization that are to be patronized by the user of client subsystem 104 on behalf of the grantor (not shown in FIG. 1). Screen shot 400 of FIG. 4 shows the user of client subsystem 104 successfully accessing the POA document using her decryption key.

III. Further Comments and/or Embodiments

Some embodiments of the present invention recognize one, or more, of the following facts, potential problems and/or potential areas for improvement with respect to the current state of the art: (i) a problem with existing POA managers is that privacy of the POA is not protected; (ii) what is needed is a method to protect privacy of POA and to provide immutability by using Public Key Cryptography (PKI) methods; (iii) addresses privacy concerns. each grantor only has access to grantor's POA information and will not know anything about POAs between other grantors and receivers; (iv) provides privacy and immutability by using PM and allows auditing; and/or (v) helps insure that any legal proceedings in connection with the POA (for example, legal challenges to the POA brought by grantors/receivers) will have access to good, reliable information concerning the POA and various aspects of its legal integrity.

Some embodiments of the present invention may include one, or more, of the following operations, features, characteristics and/or advantages: (i) a method and system to protect privacy of POA documents and provide immutability using PKI; (ii) manages POA of grantors and receivers while protecting privacy and providing immutability using PKI; (iii) POA authority utilizes PKI to provide POA transaction receipts that are secure and verifiable while still protecting customer privacy; (iv) service provider can request POA information about grantor and receiver from POA authority after confirming its identity by signing request or a challenge using its private key and provide service; (v) auditor can audit POA information at POA authority after confirming its identity by signing request or a challenge using its private key; and/or (vi) POA grantor/receiver can challenge POA authority using receipt by engaging an auditor.

Some embodiments of the present invention may include one, or more, of the following operations, features, characteristics and/or advantages: (i) protects privacy of POAs by storing them at POA authority in a secure and immutable way; (ii) all parties sign (for example, sign by electronic signature in a legal jurisdiction that accepts electronic signatures) a legally binding contract that grants the POA Authority rights to manage POA using PKI; (iii) PKI certificates are issued to POA grantors, receivers, authority, service provider and auditor by a trusted certificate authority (in some embodiments, a Certificate Authority is issues end-entity PKI certificates for the grantor, receiver, service provider and POA authority); (iv) POA grantors send requests to grant POA to POA receiver; (v) the requests are signed by grantor and receiver and verified by the POA authority who signs the request and adds it to the database; (vi) the new request along with the signature from the previous request is signed in order to provide immutability by the POA authority; (vii) the signature is sent as receipt back to the grantor and receiver; and/or (viii) POA grantor/receiver can challenge the POA authority using the receipt by engaging an auditor.

Some embodiments of the present invention may include one, or more, of the following operations, features, characteristics and/or advantages: (i) immutability ensures service provider can justify providing service in the past based on the available POA information at that time in the past; (ii) service providers, such as banks, can send a signed request with details about grantor and receiver to the POA authority; (iii) the POA Authority can verify the service provider's signature, access the POA database and provide the requested information and service providers can approve/reject service request; (iv) an auditor can audit POA database after confirming its identity; and/or (v) a grantor/receiver can challenge the POA authority using receipts.

Some embodiments of the present invention may include one, or more, of the following operations, features, characteristics and/or advantages: (i) immutable and/or tamper-proof database provides security and integrity; (ii) provides an immutable record of all POA changes and the latest receipt has most recent POA update; (iii) having one receipt per group of grantor's requests addresses privacy concerns by ensuring that one grantor will not have access to other grantor's information; (iv) receipts help grantors and receivers to challenge the POA authority by engaging an auditor; and/or (v) service provider can verify POA information and Auditor can audit POA using cryptographic verification.

Figure 5:
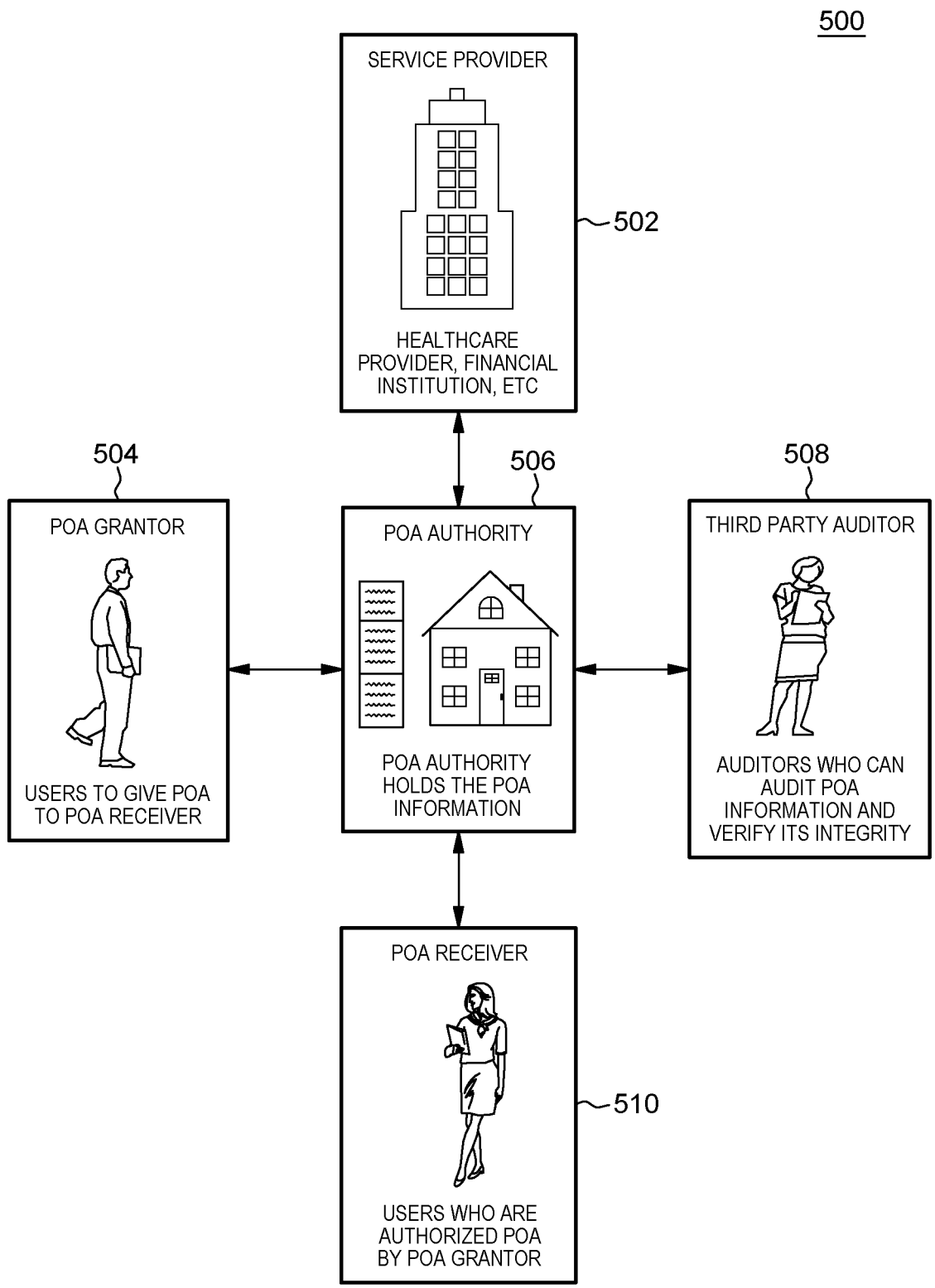
FIG. 5 is a block diagram view of a second embodiment of a system according to the present invention.

As shown in FIG. 5, system 500 shows five (5) blocks of the system perform functions or operations as follows: (i) POA Grantor 504 is an individual/company granting/changing/revoking POA to a receiver; (ii) POA Receiver 510 is an individual/company receiving POA to request a service from a service provider; (iii) POA Authority 506 is a law firm/government type of entity that maintains POA for multiple POA grantors/receivers; (iv) Service Provider 502 is a healthcare provider/Financial institution that provides a service such as a loan; and (v) Auditor 508 is a law enforcement/regulatory body auditing the POA information stored by the POA authority. A Certificate Authority (CA) (not separately shown in FIG. 5) interacts with system 500 by issuing certificates (public key) and private keys for above parties after verifying identity of the parties through standard proof of identity techniques. In some embodiments, the POA Authority and the CA may be the same entity, using a common set of enterprise computers to perform the various POA and CA related operations described herein.

Figure 6:
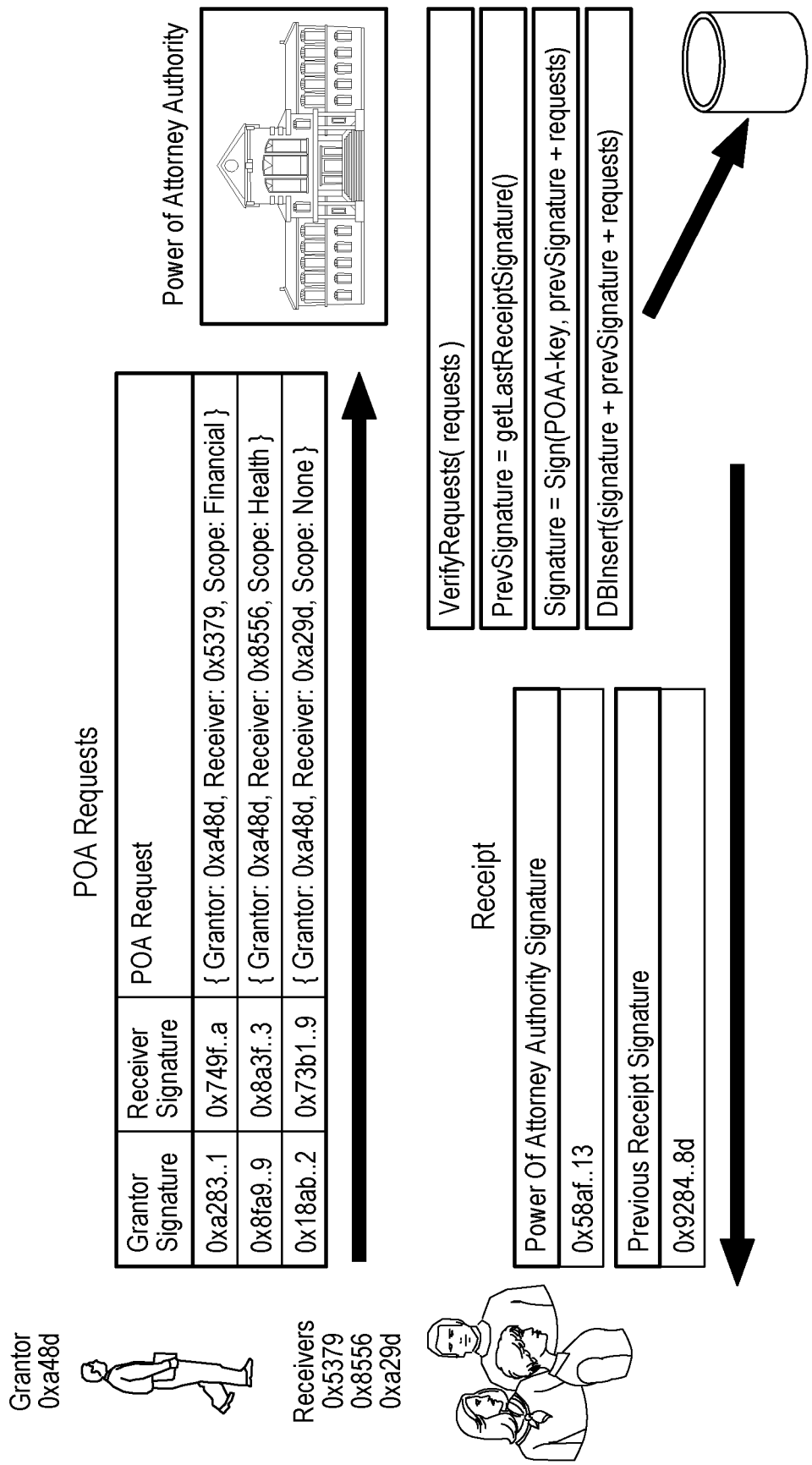
FIG. 6 is a block diagram of a series of transactions made according to an embodiment of the present invention.

In some embodiments, a POA grantor sends identity information (public key, . . . ) of grantor and receiver and the POA information signed by the grantor and receiver to the POA Authority. As shown in FIG. 6, the grantor sends POAs for 3 receivers, the POA authority validates the signatures and signs the POA requests and signature of latest receipt (to ensure immutability of the database) to create a receipt. In some embodiments, the receipt (the POA authority signature) is stored in the database (optionally, the grantor/receiver may request the POA authority to identify itself) In some embodiments, the POA authority sends the receipt to the grantor. In some embodiments, the POA grantor validates the receipt and stores it and shares it with receiver or any trusted party such as grantor's lawyer/heir. In some embodiments, the receipt can be used to retrieve the POA information from the POA authority.

As shown in FIG. 6, diagram 600 depicts the sequence flow involved in granting/changing/revoking POA by a grantor.

A method, according to an embodiment of the present invention, for a POA Receiver utilizing a granted POA at a service provider: (i) POA receiver requests a service authorized by the POA from a service provider on behalf of the grantor and sends the details (identity, public key . . . ) about the grantor and receiver; (ii) POA receiver, service provider and POA authority can mutually authenticate one another by signing a challenge; (iii) service provider requests POA information for the grantor and the receiver from the POA authority; (iv) POA authority retrieves the receipts corresponding to the grantor, verifies the receipts and filters the information corresponding to the receiver and sends information back to the service provider; (v) service provider reviews the signed POA information and verifies the signatures using the public keys of the receiver and grantor; and (vi) service provider approves/rejects the service request, as appropriate consistent with security practices and policies.

Figure 7:
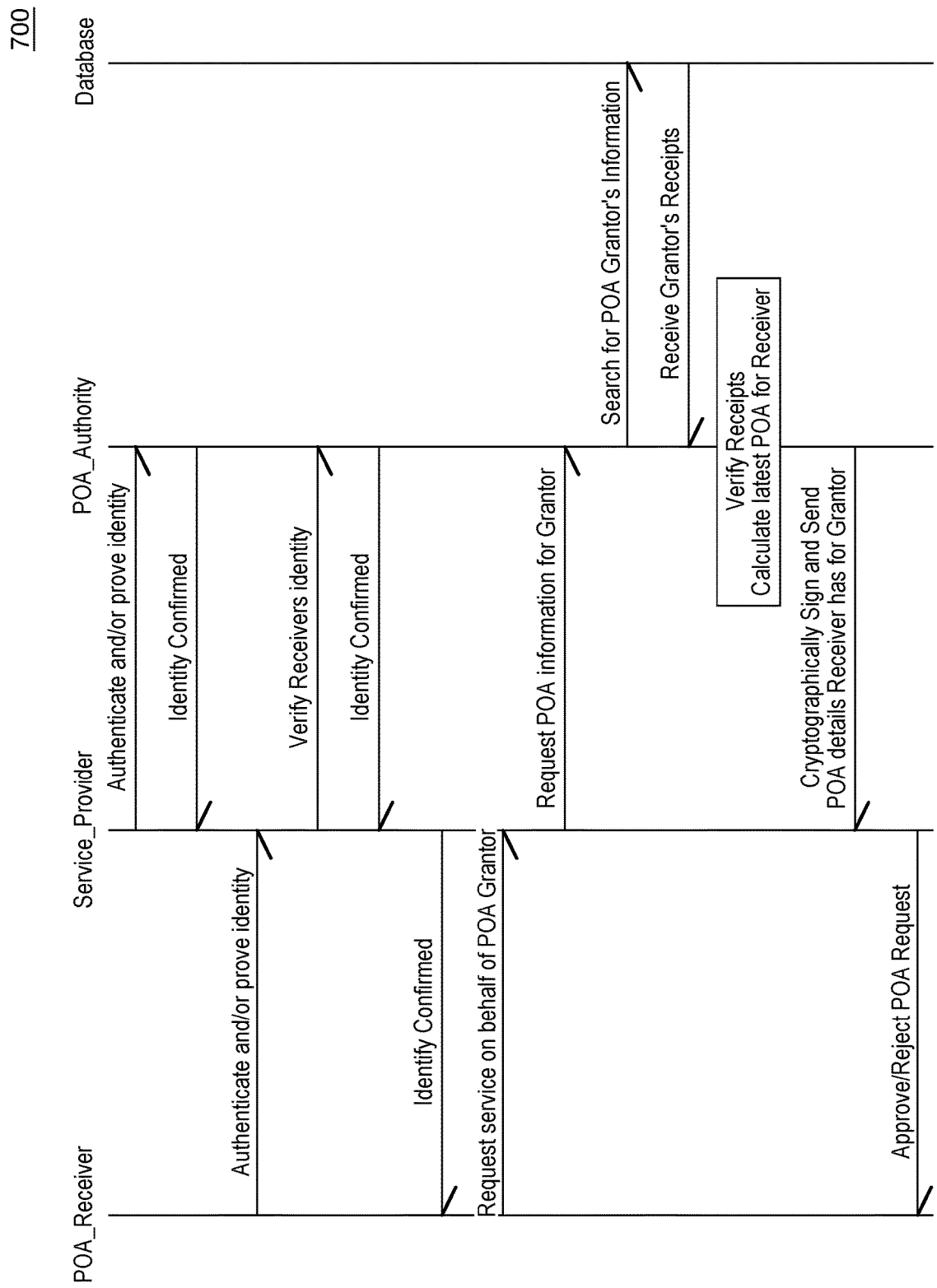
FIG. 7 is a sequence diagram helpful in understanding some embodiments of the present invention.

As shown in FIG. 7, sequence diagram 700 shows the steps involved in requesting a service from service provider.

A method, according to an embodiment of the present invention, for third party auditor to audit POA information held by POA authority will now be set forth: (i) third party auditor requests POA database access from POA authority after mutual authentication; (ii) auditor runs POA validation software on the POA database; (iii) auditor verifies all receipts are valid in database; (iv) auditor verifies all individual receipts and requests in the database using respective public keys; and (v) the auditor can request receipts from all grantors and can verify that they exist in the database.

Figure 8:
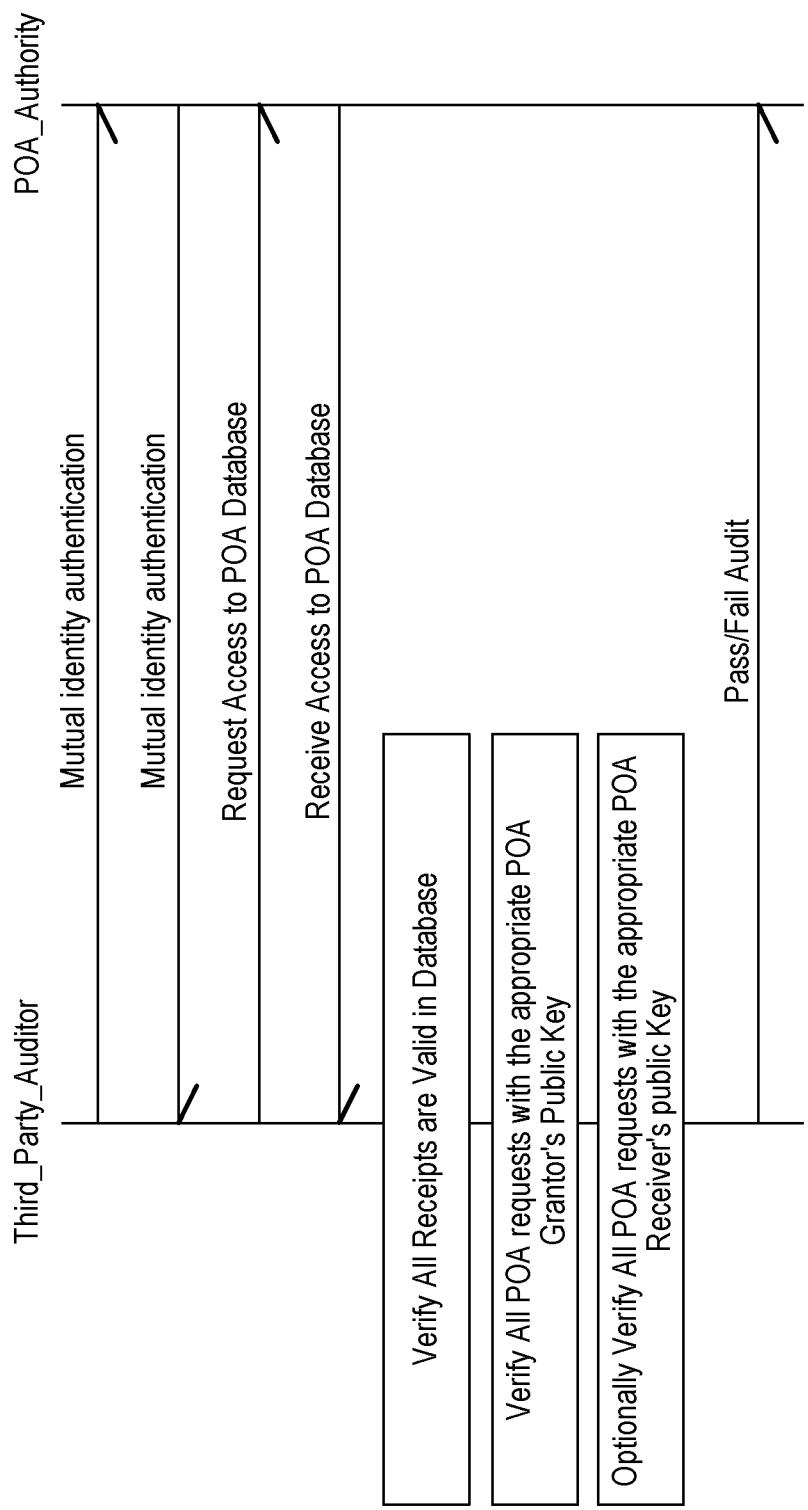
FIG. 8 is a sequence diagram helpful in understanding some embodiments of the present invention.

As shown in FIG. 8, sequence diagram 800 shows the steps involved in performing audit of POA information.

A method, according to an embodiment of the present invention, for a POA Receiver/Grantor challenging the POA Authority will now be set forth: (i) when a service provider rejects a service to a POA receiver, the POA Receiver or grantor can challenge the POA authority by engaging a third party auditor; (ii) all parties pre-authenticate one another by signing/verifying challenges using PKI; (iii) POA receiver or grantor sends information about POA grantor and POA receiver to the auditor; (iv) POA receiver or grantor can optionally send receipts to the auditor; (v) auditor requests POA database access from POA authority; (vi) auditor verifies all receipts are valid in the database and verifies the signatures; (vii) auditor optionally verifies if the receipts comprising of POA signatures are in the database; and (viii) auditor sends pass/fail result back to POA authority and receiver/grantor.

Figure 9:
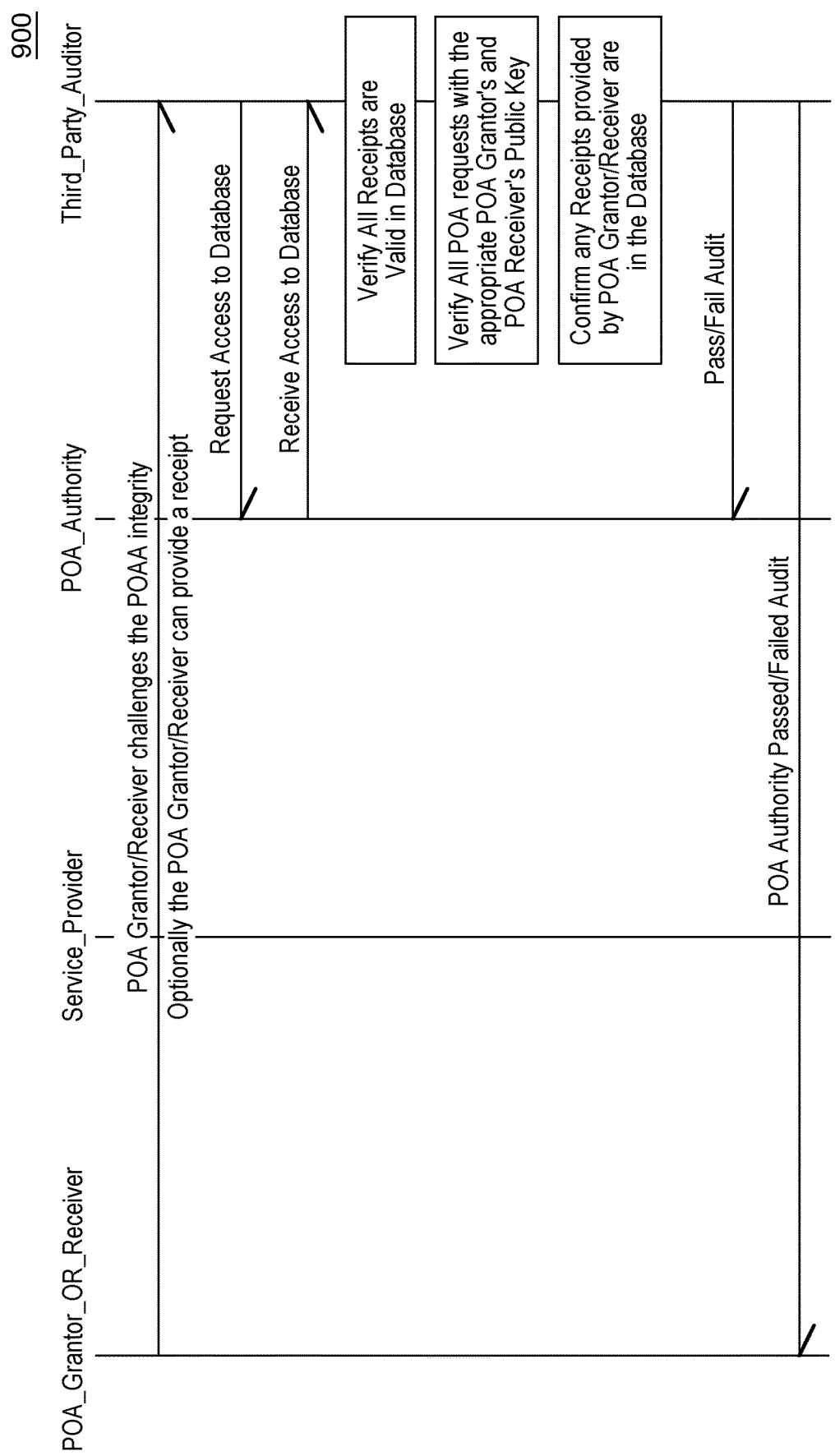
FIG. 9 is a sequence diagram helpful in understanding some embodiments of the present invention.

As shown in FIG. 9, sequence diagram 900 shows the steps involved in engaging auditor to challenge POA authority.

Figure 10:
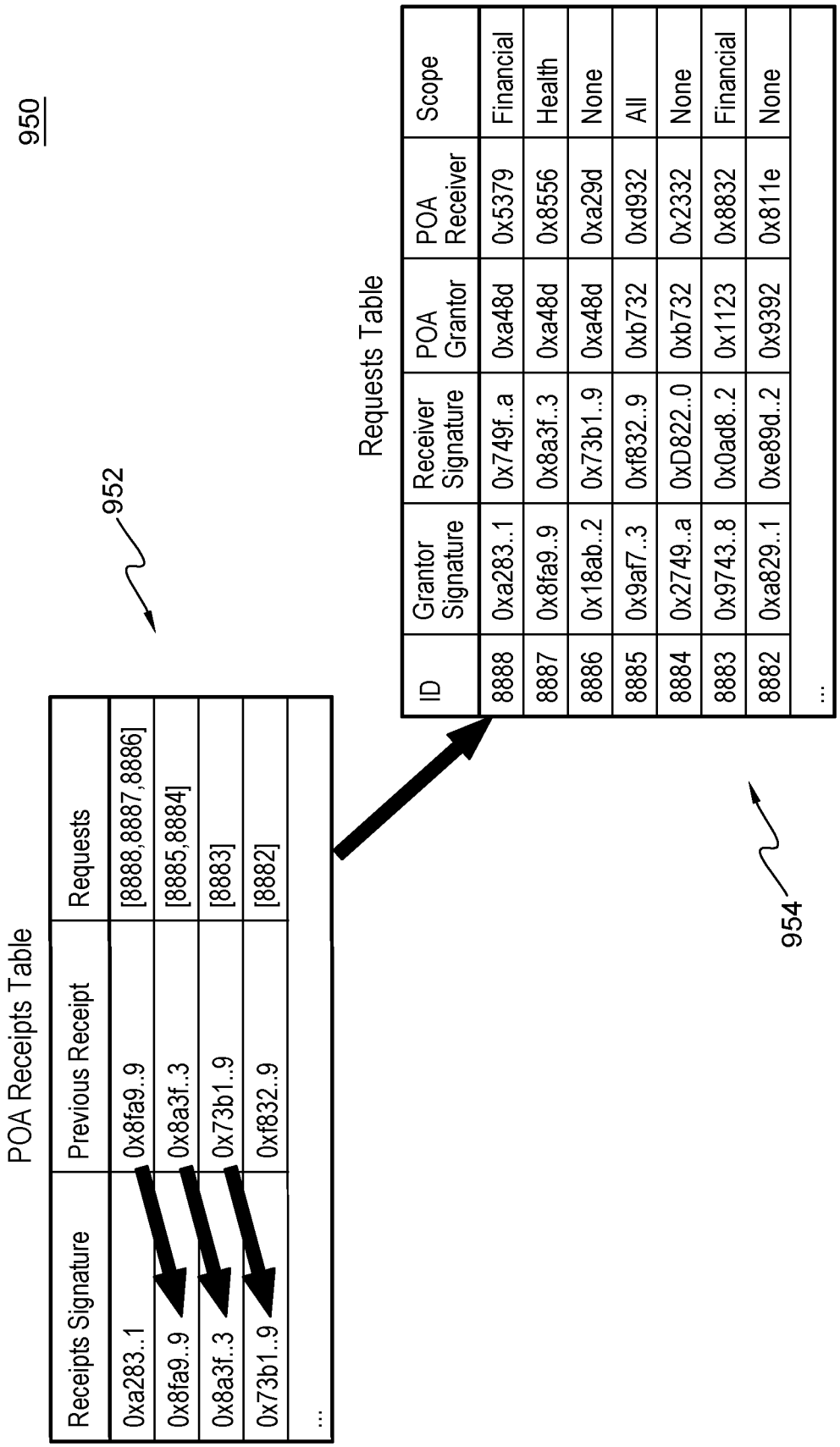
FIG. 10 is a diagram helpful in understanding some embodiments of the present invention.

As shown in FIG. 10, diagram 950 depicts an example database created by the POA authority. Diagram 950 includes: POA receipts table 952; and Requests table 954. Privacy of grantors has been preserved by storing only one grantor information per receipt and using PKI.

Some embodiments of the present invention may include one, or more, of the following operations, features, characteristics and/or advantages: (i) the POA rules governing POAs vary by legal jurisdiction, state and country; (ii) any given implementation will typically be designed to suit the legally operative rules, laws and/or regulations that apply to POA grantors and POA receivers who will be using the given implementation (for example, signing of the POA by receiver is not needed in some jurisdictions); (iii) if a private key of a grantor/receiver is compromised, the certificate authority revokes the certificate, provides signed revocation information to grantor/POA authority; (iv) POA authority can add the signed revocation information in the database which will invalidate all POA information for that grantor in the database. CA reissues a new certificate and private key, and the grantor then reissues POAs; (v) if private key of Service Provider/Auditor is compromised, the revocation information signed by CA is stored in the database and the next service request or audit access request is rejected; and/or (vi) if private key of POA authority is compromised then the whole database is invalidated.

Some embodiments provide privacy by having only POAs granted by one grantor per entry in the receipts table. As is shown in FIG. 10, POA receipts table 952 includes four records (that is, rows), with each record having a different grantor value in its grantor field. The first row of POA receipts table 952 includes three (3) associated requests, but they all belong to a common grantor and are all included in a single record. This helps to segregate records on a grantor by grantor basis. Each grantor will receive a receipt which is one row of the receipts table. In this way, each grantor will never be able to determine the identity of other grantors and/or associated receivers. This provides privacy in a manner not found in the currently conventional technology.

Some embodiments provide immutability by including a previous receipt signature in the current data to be signed by the authority administering the various POAs. With regard to providing immutability, this works similar to how a blockchain works (and may, in some embodiments, utilize actual blockchain technology) and provides immutability. In this way, it becomes extremely difficult for the POA authority to tamper with the POA information of various grantors and receivers.

In some embodiments, all POA information is digitally signed by grantor, receiver and POA authority using their respective private keys and therefore the integrity of POA information is protected and is subject to more reliable and accurate auditing.

In some embodiments, A grantor or receiver (or representative or agent thereof) can use receipts to challenge the POA authority by engaging an auditor.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
designating a power of attorney (POA) authority entity as a repository to store POA documents;
receiving, from a first POA grantor, over a communication network, and by a device of the POA authority entity, a first power of attorney (POA) data set including a first POA file that includes information indicative of a first POA document and a first set of encryption signature(s);
verifying, by the POA authority entity, the first set of encryption signature(s);
responsive to the verification of the first set of encryption signature(s), creating a second POA data set that is signed by a second set of encryption key(s) owned by the POA authority entity, with the second POA data set including the first POA document and the first set of encryption key(s);
storing, by the POA authority, the second POA data set so that the first POA document is stored in an immutable manner because the first POA document can only be decrypted using the first set of encryption key(s) that can only be obtained after using the second set of encryption key(s) of the POA authority entity;
receiving, by a requester party, a requested service related to the first POA;
rejecting, by the POA authority entity, the requested service;
receiving, from a third party auditor, a challenge to the rejection of the requested service by the POA authority;
pre-authenticating the third party auditor, the POA authority entity and the requester party by signing and verifying challenges using PKI; and
sending, by the first POA grantor, information about the first POA grantor and a first POA receiver to the third party auditor.

2. The CIM of claim 1 further comprising:
receiving, from a POA receiver, through a communication network and by the POA authority entity, a request to access the first POA document;
verifying, by the POA authority entity, authenticity of the request;
responsive to the verification, decrypting, by the POA authority entity the second POA data set, using the second set of encryption key(s) and then the first set of encryption key(s) to obtain a decrypted version of the first POA document; and
allowing access to the decrypted version of the first POA document by the POA receiver.

3. The CIM of claim 1 further comprising:
sending, by the POA receiver, receipts to the third party auditor;
verifying, by the third party auditor, that all receipts are valid in the repository;
verifying, by the third party auditor, that POA signatures present in the first POA document are stored in the repository; and
sending, by the third party auditor, a pass/fail result back to the requesting party.

4. A computer program product (CPP) comprising:
a set of storage device(s); and
computer code stored collectively in the set of storage device(s), with the computer code including data and instructions to cause a processor(s) set to perform at least the following operations:
designating a power of attorney (POA) authority entity as a repository to store POA documents,
receiving, from a first POA grantor, over a communication network, and by a device of the POA authority entity, a first power of attorney (POA) data set including a first POA file that includes information indicative of a first POA document and a first set of encryption signature(s), verifying, by the POA authority entity, the first set of encryption signature(s), responsive to the verification of the first set of encryption signature(s), creating a second POA data set that is signed by a second set of encryption key(s) owned by the POA authority entity, with the second POA data set including the first POA document and the first set of encryption key(s), storing, by the POA authority, the second POA data set so that the first POA document is stored in an immutable manner because the first POA document can only be decrypted using the first set of encryption key(s) that can only be obtained after using the second set of encryption key(s) of the POA authority entity, receiving, by a requester party, a requested service related to the first POA; rejecting, by the POA authority entity, the requested service, receiving, from a third party auditor, a challenge to the rejection of the requested service by the POA authority, pre-authenticating the third party auditor, the POA authority entity and the requester party by signing and verifying challenges using PKI, and sending, by the first POA grantor, information about the first POA grantor and a first POA receiver to the third party auditor.

5. The CPP of claim 4 further comprising:

receiving, from a POA receiver, through a communication network and by the POA authority entity, a request to access the first POA document;

verifying, by the POA authority entity, authenticity of the request;

responsive to the verification, decrypting, by the POA authority entity the second POA data set, using the second set of encryption key(s) and then the first set of encryption key(s) to obtain a decrypted version of the first POA document; and allowing access to the decrypted version of the first POA document by the POA receiver.

6. The CPP of claim 4 further comprising:

sending, by the POA receiver, receipts to the third party auditor;

verifying, by the third party auditor, that all receipts are valid in the repository;

verifying, by the third party auditor, that POA signatures present in the first POA document are stored in the repository; and sending, by the third party auditor, a pass/fail result back to the requesting party.

7. A computer system (CS) comprising:

a processor(s) set;

a set of storage device(s); and computer code stored collectively in the set of storage device(s), with the computer code including data and instructions to cause the processor(s) set to perform at least the following operations:

designating a power of attorney (POA) authority entity as a repository to store POA documents, receiving, from a first POA grantor, over a communication network, and by a device of the POA authority entity, a first power of attorney (POA) data set including a first POA file that includes information indicative of a first POA document and a first set of encryption signature(s), verifying, by the POA authority entity, the first set of encryption signature(s), responsive to the verification of the first set of encryption signature(s), creating a second POA data set that is signed by a second set of encryption key(s) owned by the POA authority entity, with the second POA data set including the first POA document and the first set of encryption key(s), storing, by the POA authority, the second POA data set so that the first POA document is stored in an immutable manner because the first POA document can only be decrypted using the first set of encryption key(s) that can only be obtained after using the second set of encryption key(s) of the POA authority entity, receiving, by a requester party, a requested service related to the first POA; rejecting, by the POA authority entity, the requested service, receiving, from a third party auditor, a challenge to the rejection of the requested service by the POA authority, pre-authenticating the third party auditor, the POA authority entity and the requester party by signing and verifying challenges using PKI, and sending, by the first POA grantor, information about the first POA grantor and a first POA receiver to the third party auditor.

8. The CS of claim 7 further comprising:

receiving, from a POA receiver, through a communication network and by the POA authority entity, a request to access the first POA document;

verifying, by the POA authority entity, authenticity of the request;

responsive to the verification, decrypting, by the POA authority entity the second POA data set, using the second set of encryption key(s) and then the first set of encryption key(s) to obtain a decrypted version of the first POA document; and allowing access to the decrypted version of the first POA document by the POA receiver.

9. The CS of claim 7 further comprising:

sending, by the POA receiver, receipts to the third party auditor;

verifying, by the third party auditor, that all receipts are valid in the repository;

verifying, by the third party auditor, that POA signatures present in the first POA document are stored in the repository; and sending, by the third party auditor, a pass/fail result back to the requesting party.

\* \* \* \* \*